W. C. STEVENS.
MACHINE AND METHOD FOR BUILDING TIRES.
APPLICATION FILED JULY 31, 1913. RENEWED JULY 22, 1918.
1,352,099.
Patented Sept. 7, 1920.
2 SHEETS—SHEET 1.
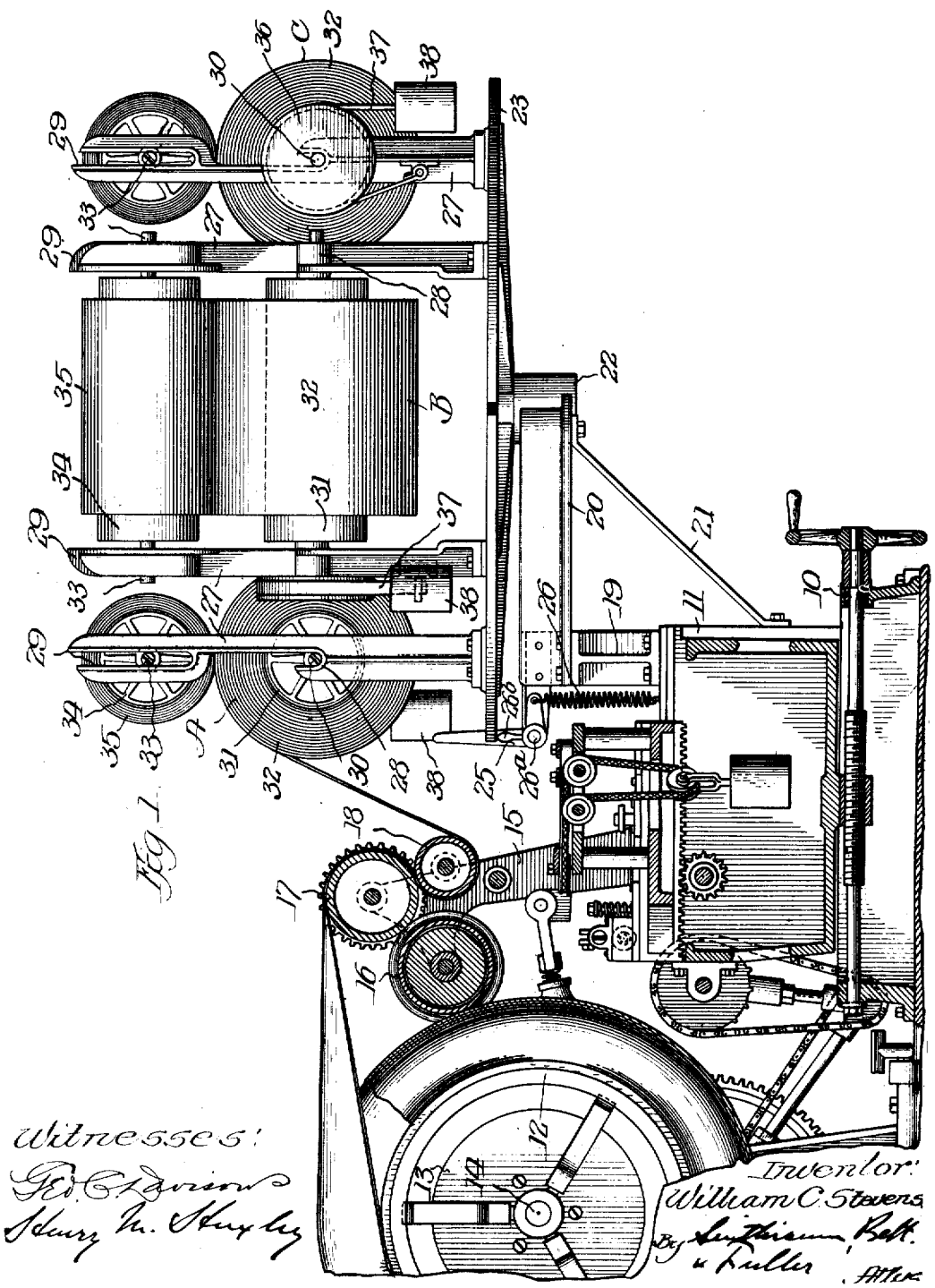

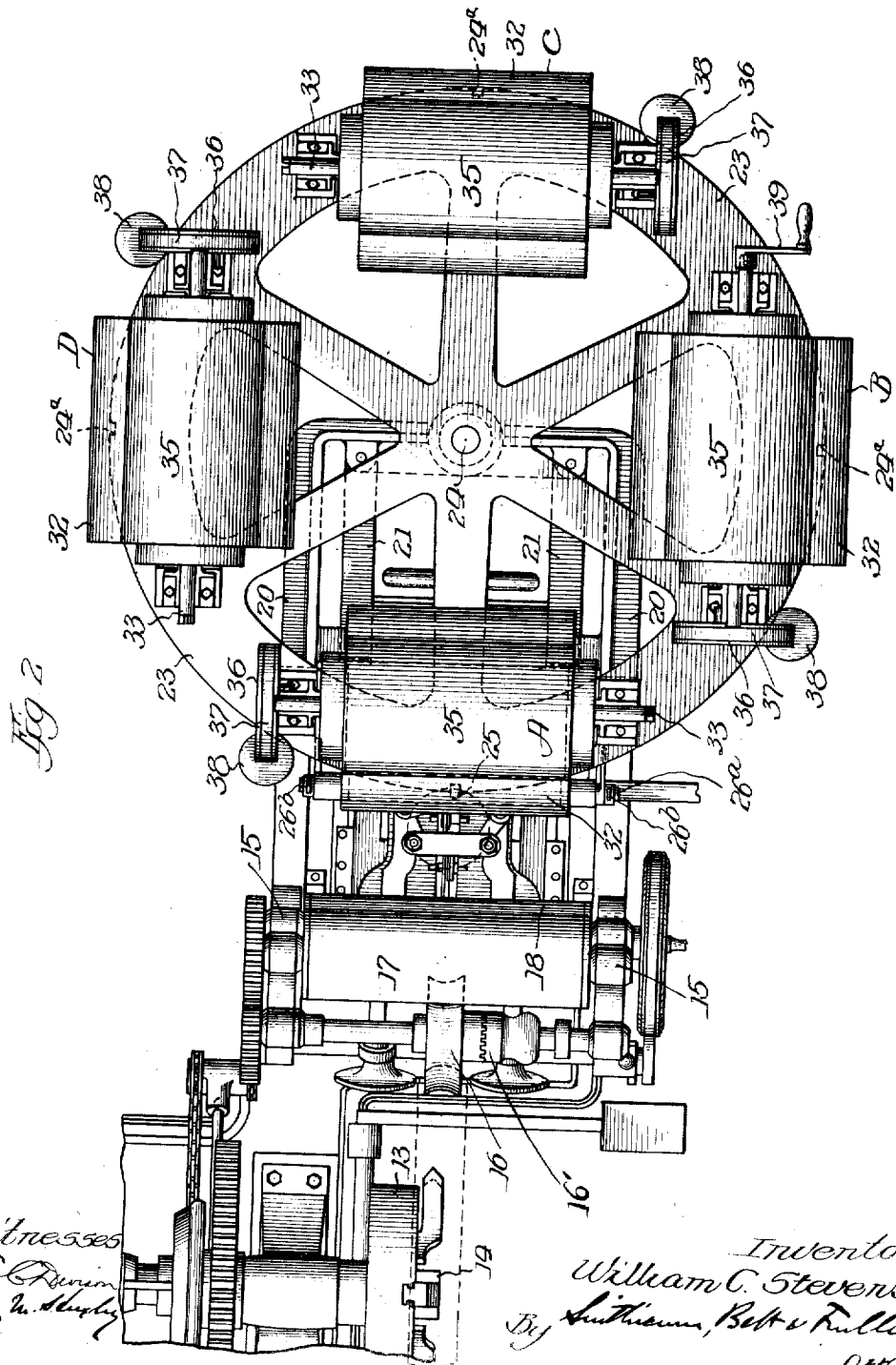

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

MACHINE AND METHOD FOR BUILDING TIRES.

1,352,099. Specification of Letters Patent. Patented Sept. 7, 1920.

Application filed July 31, 1913, Serial No. 782,174. Renewed July 22, 1918. Serial No. 246,232.

*To all whom it may concern:*

Be it known that I, WILLIAM C. STEVENS, a citizen of the United States, residing at Akron, in the county of Summit and State of Ohio, have invented certain new and useful Improvements in Machines and Methods for Building Tires, of which the following is a specification.

My invention relates to methods of and apparatus for making tires, and refers particularly to the supporting and supplying the duck stock of which the tire is built up.

In my Patent No. 1,253,105, application filed April 12, 1913, I have described an improved machine for making tire carcasses. In the machine which is used in connection with the present invention the mechanism for operating the various parts on which the tire carcass is built up may be the same as that employed in the machine described in my co-pending application above mentioned.

In building up a tire by the use of my former machine in which a single drum was used for supporting the frictioned duck used in making the tire it was necessary to apply to this drum strips of material of various lengths and widths; for example, assuming that the tire carcass was to be built up of four layers of frictioned duck, four strips were successively rolled up on the drum in proper order for application to the tire carcass. As many such series of four strips was applied to the drum as could be accommodated thereon for use in making up as many tire carcasses as possible.

It will be apparent to those skilled in the art that there are many disadvantages in the machine and method of operation which I have just described in general terms; for example, since the width of various strips is only slightly different, confusion is very apt to take place in applying the strips to the drum with consequent difficulty resulting when the strips are used in making the tire carcass. Again, since strips of varying widths are used on the same drum, it is impossible to efficiently guide these strips to the tire-forming mechanism, so that it has been customary to allow for each strip an appreciable excess width to make up for variations in applying the same. This excess material is subsequently removed from the tire carcass by cutting. Still again, since the strips are made up in predetermined lengths of material cut on the bias, it has always been necessary to allow a slight excess in the length of each strip, thereby causing waste in making up the carcass.

It is the object of my present invention to overcome the above-mentioned difficulties, and this I do by providing a plurality of drums or other retaining means which are successively brought into operative relation with the tire-forming mechanism. In a preferred embodiment of my invention I employ a plurality of drums (four ordinarily being used), each of which contains a roll of frictioned duck of a given width, each drum having material of a different width from that on every other drum. These drums are mounted on a rotatable framework or platform so that any desired drum may quickly and easily be brought into such position that the material thereon may be withdrawn from the drum and by the appropriate mechanism used in building up the tire carcass. By the use of this improvement it is unnecessary to make up strips of frictioned duck of any specific length since in building up the carcass when the proper amount of duck has been applied, the material is simply cut or torn the exact length required, and another drum containing material of a different width is then moved into position and the next layer of duck is applied to the tire carcass. Since all the material on a single drum is of exactly the same width, I have found that the material used may be appreciably narrower than was the case with my machine in which a single drum contained strips of various widths. It will be evident, therefore, that by eliminating waste in both the length and width of the strips which are applied to the carcass, a great saving is effected. Whereas occasionally confusion and loss of time were likely to result in the use of the system employed in my former machine on account of mixing the strips of different widths, these difficulties have been entirely eliminated in the machine of my present invention, since the various rolls of material of different widths are kept separate and distinct from each other. In the case of my improved machine it is necessary to use only a single mechanism for applying and stretching the various strips or plies which are used in building up the carcass, since, as previously pointed out, each drum can be brought into operative relation with such mechanism when desired.

These and other advantages of my invention will be more readily understood by reference to the accompanying drawings which show a preferred embodiment of my improvements, and in which—

Figure 1 is a side elevation and partly sectional view of my improved tire machine; and Fig. 2 is a plan of the machine shown in Fig. 1.

It will be unnecessary in this application for me to give a detailed description of the various parts which are used in applying the frictioned duck to the tire form and rolling the same into position, since this portion of the machine forms no part of my present invention. To make my invention clearly intelligible to those skilled in the art it is merely necessary to point out that the base 10, having thereon the framework 11, supports the various parts which are used in applying the plies of frictioned duck to the tire form 12, which is applied to the universal expansion chuck 12 rotatable with the shaft 14.

Among the parts carried by the base 10 is the frame 15, on which are mounted the checking or retarding roller 16, the stretching roller 17, and the guide roller 18. The checking roller 16 has frictional engagement with the tire carcass, and is connected by suitable gearing with the stretching roller 17, so that the stretching action of the latter is always constant and independent of the width of material being applied. In the driving connections from the roller 16 to the stretching roller 17 is a clutch 16' which may be operated to disconnect the stretching roller from the core rotating means through the retarding roller.

Mounted on the framework 11 is an I-beam 19, to which is attached the supporting frame 20 reinforced by the braces 21. Toward the rear of the framework 20 is the bearing 22 which carries the support for the rolls of friction, which in this case is a platform 23. This platform is rotatable on the shaft 24 carried by the bearing 22. The platform 23 is preferably circular, and is provided in its periphery with the notches 24ᵃ. The bell-crank lever 25 controlled by the spring 26 and mounted on the shaft 26ᵃ is adapted to engage any one of the notches 24ᵃ and serves to lock the platform 23 in the position to which it has been rotated. Handles 26ᵇ are provided on the ends of shaft 26ᵃ so that the latter may readily be rocked as required.

The platform 23 carries four pairs of brackets 27, 27. Each bracket is formed with a bearing slot 28 in its lower portion and an elongated bearing slot 29 in its upper portion. The bearing slots 28, 28 of each pair of brackets 27, 27 serve to support a shaft 30, on which is mounted the containing drum 31. Each of the drums 31 is adapted to contain a roll of frictioned duck 32, the four rolls of such material being indicated in the drawings by A, B, C and D, respectively.

The slots 29, 29 of each pair of brackets 27, 27 receive the ends of the shaft 33, which carries the drum 34 on which the cotton cloth liner 35 is wound. On account of the length of the slots 29 each roll of liner is allowed to rest on the roll of frictioned duck 32 located directly beneath it.

In order to prevent the rolls of duck from unwinding too rapidly each of the shafts 30 is provided on one end with a disk 36 having its periphery engaged by the band brake 37 having the weight 38.

Having now described the various parts which are used in my invention, the operation of the same may now be readily understood: In building up the tire carcass the frictioned duck 32 coming from the narrowest roll, which we will assume is A, is passed around the guide roller 18 and the stretching roller 17 to the tire form 12, which is rotated by means of the shaft 14 until one layer of frictioned duck has been applied to the tire. The material is then cut off at the proper point, and the free end is withdrawn from the stretching roller 17 and the guide roller 18 and rewound on the roll A. To facilitate this rewinding the removable crank 39 may be applied to the end of the shaft 30. In rotating the shaft 14 the frictioned duck 32 has been stretched and rolled into position. As the duck 32 is unwound from the roll A the liner 35 placed between the layers of duck of which the roll A is formed is wound onto the drum 34.

One layer of duck having thus been applied from the roll A, the operator now releases the bell-crank lever 25 by moving it to the left from the position indicated in Fig. 1, and the platform 23 is rotated, for example, in a clockwise direction, until the lever 25 engages the next notch 24, whereby the roll B is brought into the position just occupied by the roll A. The material of roll B is slightly wider than that of roll A by reason of the increased diameter of the tire carcass which is being built up. The material of roll B is now applied to the tire in exactly the same manner as previously described in connection with roll A. When this operation is completed further material of gradually increasing width is successively applied from roll C and roll D. Where beads are applied to the tire, the usual method of building up the tire consists in applying such beads after two plies of frictioned duck have been stretched onto the form. The next two plies are then stretched into position and cover the beads. As previously described, the construction of the fabric applying means is such that even with plies of considerably different widths, the stretching of each ply is a constant percentage. The particular form of stretching mechanism is not an essential part of this invention, although the form shown is preferred by me, and the stretching roller 17 may be rotated in any preferred manner so that it is rotated at a less peripheral speed than the peripheral speed of the core.

It will be clear that by the use of my improvement four times as much frictioned duck is carried by the machine as when a single containing drum is used. In this way the machine need be stopped only one-fourth as often for the purpose of loading it with fresh material, and the capacity of the machine is thereby increased.

I do not desire to be limited to a number of stock rolls equal to the number of plies found in a tire, as a less number of rolls may be used, it being practicable to make two or perhaps three adjacent plies from the same width of fabric.

It will be apparent to those skilled in the art that considerable change might be made in the construction of the various parts which I have described without departing from the spirit or scope of my invention, and without sacrificing any of the advantages thereof.

What I claim is:

1. In a tire making machine, the combination of a tire form, a single means for stretching the tire fabric as it is applied to said form, a plurality of fabric stock rolls, and means for permitting said rolls to be brought selectively into coöperative relation with said tire form and fabric stretching means, substantially as described.

2. In a tire making machine, the combination of a tire form, means for stretching the tire fabric as it is applied to said form, a plurality of fabric stock rolls, each of said stock rolls being adapted to contain stock of substantially uniform width, the stock on the various rolls differing in width and being adapted to be used for different plies, and means permitting said stock rolls to be brought successively into coöperative relation with said tire form and fabric stretching means, substantially as described.

3. In a tire making machine, the combination of a revoluble tire form, a single fabric tension means adapted to act on the fabric plies as they are applied to the form, the coöperative action of said revoluble form and tension means on the plies stretching the plies in precise relation to the surface travel of the form or the fabric plies thereon, a plurality of fabric stock rolls, and means permitting said rolls to be brought selectively into operative relation with said tire form and fabric tension means, whereby all plies are stretched endwise uniformly the same percentage of their original length regardless of their dimensions and conditions, substantially as described.

4. In a tire making machine, the combination of a revoluble tire form, fabric tension means including a roller over which fabric plies pass as they are applied to the form, said fabric tension means retarding the rotation of said roller in precise relation to the travel of the surface of the core or fabric plies thereon to which the plies are to be applied, a plurality of fabric stock rolls, each of said stock rolls being adapted to contain stock of substantially uniform width, the stock on the various rolls differing in width and being adapted to be used for different plies, and means permitting said stock rolls to be brought selectively into coöperative relation with said tire form and fabric tension means, whereby the coöperative action of said revoluble form and tension means stretches all of said plies endwise uniformly the same percentage of their original length, substantially as described.

5. In a machine of the character set forth, the combination of a core and revolving means therefor, a support for a plurality of rolls of fabric, a stretching roller common to the rolls of fabric, means for retarding the rotation of the stretching roller, said retarding means being driven from the core revolving means, and means for stopping the operation of the stretching roller without affecting the position of the retarding means with respect to the core driving means.

6. In a machine of the character set forth, the combination of a core and means for rotating it, a support for a plurality of rolls of fabric, a stretching roller, means for retarding the rotation of the stretching roller, said retarding means being driven from the core rotating means, means for interrupting the connection between the core revolving means and the stretching roller, said support and said core being relatively movable so as to bring selectively the rolls of fabric, the stretching roller and the core into coöperative relation.

7. In a machine for making tire casings, the combination of a rotatable tire form carrier, a set of fabric stock rolls, a fabric tension means adapted to act on the fabric plies as they are applied to the form, said tension means comprising a stretching roll, means for retarding the rotation of the roll mechanically connected with and driven from the tire form carrier and means to move the stock rolls and tire form carrier relatively to each other in order to selectively bring the stock rolls, the tire form carrier and the tension means into coöperative relation.

8. In a machine for making tire casings, the combination of a rotatable tire form carrier, a set of fabric stock rolls, a single fabric tension means adapted to act on the fabric plies as they are applied to the form, said tension means comprising a stretching roll, a roll contacting the surface of the tire form and driving connection between the last named roll and the stretching roll to retard the action of the stretching roll, means to move the stock rolls and tire form carrier relatively to each other in order to bring selectively the stock rolls, tire form, and the tension means into coöperative relation.

9. In a machine of the character set forth, the combination of a support for a plurality of rolls of fabric, a stretching roll, a core revolving means, and connections from said revolving means to said stretching roll, for revolving said roll at a slower peripheral speed than the speed of the core, said support and said core being relatively movable so as to bring rolls of fabric selectively into coöperation with the core.

10. In a machine of the character set forth, the combination of a support for a plurality of rolls of fabric, a stretching roll from which the fabric passes to the core, a core revolving means, connections from said revolving means to said stretching roll, for revolving said roll at a slower peripheral speed than the speed of the core, means for interrupting the connections between the core revolving means and the stretching roller, said support and said core being relatively movable to bring rolls of fabric selectively into coöperation with the core.

11. In a tire making machine, means for applying fabric to the core comprising a plurality of stock rolls, a single means for feeding the fabric including a tensioning means for maintaining a uniform tension in the fabric as it is fed from the stock rolls and means for selectively bringing the stock rolls and feeding means into coöperative relation.

12. An apparatus for making tires comprising a plurality of stock rolls for supplying fabric to the core, said stock rolls being movable selectively into operative feeding position, a single tensioning device for regulating the feed of the fabric from driving said stock rolls and coupling means for said tensioning device.

13. An apparatus for making tires, comprising a plurality of stock rolls for supplying fabric to the core, said stock rolls being movable selectively into operative feeding position, a stretching roll common to the stock rolls, means for causing said stretching roller to rotate at a slower peripheral speed than the peripheral speed of the core, and a releasable clutch connected with said stretching roll.

14. In a macine for building tire carcasses the combination of a core a multiple stock roll holder, means for rotating the holder to bring the several stock rolls in coöperation with the core, a stretching roll, retarding means for the stretching roll and shiftable clutch connections between said retarding means and said stretching roll.

15. In a machine for building tire carcasses, the combination of a multiple stock roll holder, a stretching roller, and a retarding mechanism, driving connections between the stretching roller and the retarding mechanism, and means for rendering said driving connections inoperative.

16. In a machine for making tire casings, the combination of core supporting and revolving means, a plurality of sources of supply for tire material, means, comprising a stretching roll, for imparting stretch to the fabric governed by its relative speed with respect to the core, the said sources of supply and core being shiftable relatively to one another, and means associated with said stretching roll for connecting and disconnecting it from said core revolving means.

17. In a machine for making tire casings, the combination of core supporting and revolving means, a plurality of sources of supply for tire material, the said sources of supply delivering material of differing widths to the core, means, comprising a stretching roll, for imparting stretch to the fabric governed by its relative speed with respect to the core, the said sources of supply and core being shiftable relative to one another, and means associated with said stretching roll for connecting and disconnecting it from said core revolving means.

18. In a machine for making tire casings, the combination of core supporting and revolving means, a plurality of sources of supply for tire material, a roll movable toward and away from the core, the fabric from said supply passing around said roll, means for driving said roll at differential speed with respect to the speed of the core, said driving means being operatively established when the stretching roll is located nearer to the core, and means for selectively bringing the sources of supply, the core and the roll into coöperative relation.

19. In the making of tires, the steps of providing a core and a plurality of sources of tire material of different predetermined widths, and selectively bringing the core and sources of supply into coöperative relation.

20. In the making of tires, the steps of providing a core and a plurality of sources of tire material of different predetermined widths, selectively bringing the core and sources of supply into coöperative relation, and feeding material from the selected source of supply to the core.

21. In the making of tires, the steps of providing a core and a plurality of sources of tire material of different predetermined widths, selectively bringing the core and sources of supply into coöperative relation, feeding tire material from a selected source of supply to the core, winding the material around the core, and severing the material on the core from the source of supply.

22. A method of building tire casings, consisting in providing a plurality of material supplies of different predetermined widths and indeterminate lengths, feeding the material from the said supplies to the tire form selectively according to the locations in the tire.

23. A method of building tire casings, consisting in providing a plurality of material supplies of different predetermined widths and indeterminate lengths, feeding the material from the said supplies to the tire form selectively according to the locations in the tire, and severing such material from the lengths as supplied to the core.

24. A method of building tires, comprising the steps of providing a plurality of material supplies of different predetermined widths and indeterminate lengths, providing a tire form alining the tire form with said supplies selectively, drawing from the supplies selectively material to form the plies, and severing the material from the supplies after it has been applied to the form.

25. A method of building tires, comprising forming a plurality of lengths of fabric of widths sufficient to encircle the tire form or partially built tire transversely thereof and of lengths to form a plurality of layers circumferentially of the form, shifting the core and supplies to aline the same selectively, winding a sufficient number of layers of the material on the form from each length of fabric, and cutting the fabric after the required number of turns have been laid up on the form from each supply of material.

WILLIAM C. STEVENS.

Witnesses:
S. G. CARKHUFF,
T. L. RODGERS.

Corrections in Letters Patent No. 1,352,099.

It is hereby certified that in Letters Patent No. 1,352,099, granted September 7, 1920, upon the application of William C. Stevens, of Akron, Ohio, for an improvement in "Machines and Methods for Building Tires," errors appear in the printed specification requiring correction as follows: Page 2, line 26, for the reference-numeral "12" read *13;* page 4, lines 56–57, strike out the word "driving"; same page and claim, line 58, before the word "said" insert the word *driving;* and that the said Letters Patent should be read with these corrections therein that the same may conform to the record of the case in the Patent Office.

Signed and sealed this 22d day of February, A. D., 1921.

[SEAL.]

L. B. MANN,

*Acting Commissioner of Patents.*

Cl. 154—10.